Oct. 13, 1925.
N. T. DOMINGUE
ROTARY TOOTHBRUSH
Filed July 3, 1924
1,557,244
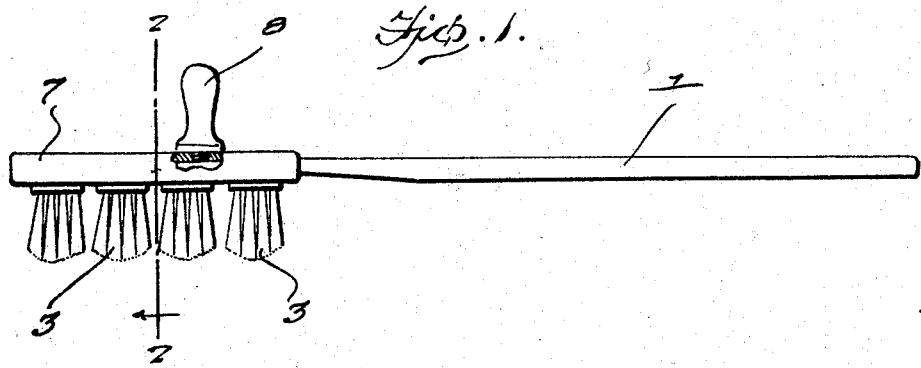
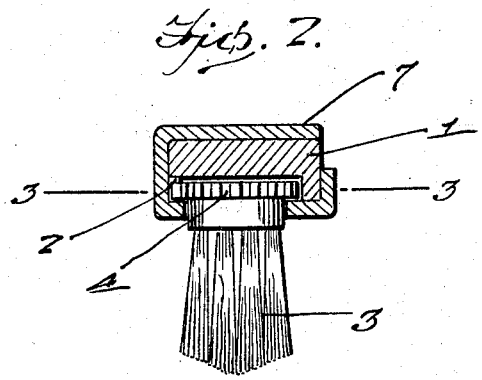
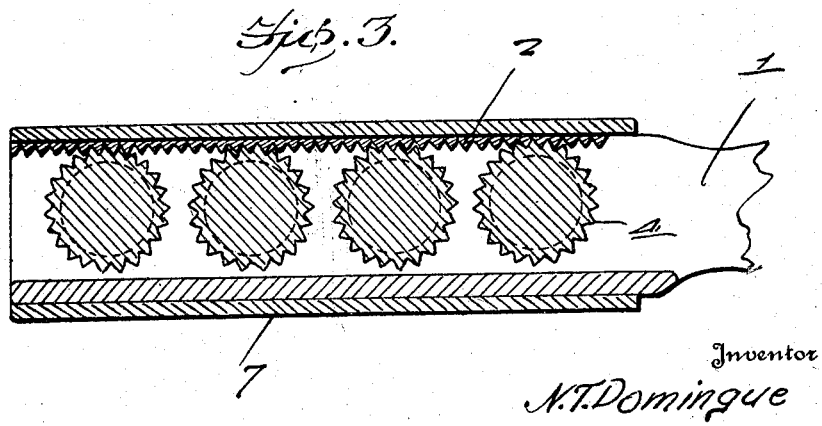
Inventor
N. T. Domingue
By Clarence A. O'Brien
Attorney Patented Oct. 13, 1925.

1,557,244

UNITED STATES PATENT OFFICE.

NAZAIRE T. DOMINGUE, OF WATERBURY, CONNECTICUT.

ROTARY TOOTHBRUSH.

Application filed July 3, 1924. Serial No. 724,044.

*To all whom it may concern:*

Be it known that I, NAZAIRE T. DOMINGUE, a citizen of the United States, residing at Waterbury, in the county of New Haven and State of Connecticut, have invented certain new and useful Improvements in a Rotary Toothbrush, of which the following is a specification.

This invention relates to an improved tooth brush and has specific reference to a device of this class wherein the brush is rotatably mounted to be rotated during the cleaning operation for more effectively removing matter from the crevises between the teeth which cannot be removed with the common type of brush.

I aim primarily to provide a tooth brush of extreme simplicity and durability which comprises a series of independently rotatable brushes.

Another feature of the invention is brought about through the use of a positive driving connection between the handle and independently rotatable brushes.

Other features and advantages of the invention will become apparent from the following description and drawing.

In the accompanying drawing forming a part of this specification and in which like numerals are employed to designate like parts throughout the same:

Figure 1 is a side elevation of a tooth brush constructed in accordance with the invention, a portion of one of the parts being broken away and shown in section to disclose the construction more clearly.

Figure 2 is an enlarged cross-section taken on the plane of the line 2—2 of Figure 1 looking in the direction of the arrow.

Figure 3 is a longitudinal section taken on the line 3—3 of Figure 3.

Referring in detail to the drawing, the numeral 1 represents a longitudinally reciprocable handle. As seen more clearly in Figure 2, the outer end of this handle is provided in its under side with a channel and the inner wall of one of the flanges of this channel is serrated to provide a longitudinally extending rack 2. As before stated, the brush includes a series of independently rotatable cleaners or brushes 3, each of which has its head equipped with a toothed pinion 4. The several pinions of the brushes are located in the aforesaid channel and the teeth thereof are engaged by the teeth of the aforesaid rack. A suitable casing 7 surrounds these parts and serves to maintain them in operative relation.

Although it is not essential, I prefer to provide the casing 7 with a detachable handle 8 which is adapted to be gripped in one hand to hold the head stationary while the handle 1 is reciprocated.

In practice, the casing 7, or the handle 8 if it is used, is held with one hand to maintain it stationary while the handle 1 reciprocated with the other hand. It is obvious that by holding the head stationary and moving the long handle, the several brushes 3 will be rotated to more effectively and easily remove foreign matter from the teeth. It is understood that the handle 8 may be removed when the inner faces of the teeth are being cleaned. Removal of this handle facilitates insertion of the brush into the mouth sufficiently far to accomplish the last named result.

While I have shown and described the preferred embodiment of the invention, it is to be understood that minor changes coming within the scope of the adjoined claim may be resorted to if desired.

Having thus described the invention, what I claim is:—

In a rotary tooth brush structure, a handle in the form of a flat bar, said bar being provided in its under side and at its outer end with a channel, the inner surface of one wall of which is serrated to provide a toothed rack, rotary cleaning elements embodying head including toothed pinions located within said channel, the teeth of the pinions meshing with the teeth of said rack, and a metal casing partially surrounding the channeled portion of the handle and pinion, and provided with longitudinally spaced openings through which said cleaning elements extend.

In testimony whereof I affix my signature.

NAZAIRE T. DOMINGUE.